United States Patent
Arai et al.

(10) Patent No.: US 7,339,644 B2
(45) Date of Patent: Mar. 4, 2008

(54) IN-PLANE SWITCHING LIQUID CRYSTAL DISPLAY AND LIQUID CRYSTAL DISPLAY CELL COMPRISING A GROOVE FORMED ABOVE THE DATA LINE

(75) Inventors: Toshiaki Arai, Shiga (JP); Taroh Hasumi, Shiga (JP)

(73) Assignee: Chi Mei Optoelectronics Corp., Taiwan (CN)

( * ) Notice: Subject to any disclaimer, the term of this patent is extended or adjusted under 35 U.S.C. 154(b) by 330 days.

(21) Appl. No.: 10/732,489

(22) Filed: Dec. 11, 2003

(65) Prior Publication Data

US 2004/0119904 A1 Jun. 24, 2004

(30) Foreign Application Priority Data

Dec. 19, 2002 (JP) .............................. 2002-368854

(51) Int. Cl.
G02F 1/1343 (2006.01)
G02F 1/1333 (2006.01)
(52) U.S. Cl. ...................... 349/141; 349/138
(58) Field of Classification Search ................ 349/122, 349/138, 139, 141
See application file for complete search history.

(56) References Cited

U.S. PATENT DOCUMENTS 6,271,543 B1 * 8/2001 Ohtani et al. .................. 257/72
6,567,150 B1 * 5/2003 Kim ............................ 349/187
6,576,924 B1 * 6/2003 Yamazaki et al. ............ 257/59
6,620,660 B2 * 9/2003 Ohtani et al. ................ 438/158
6,704,085 B2 * 3/2004 Nishimura et al. .......... 349/141
6,839,116 B2 * 1/2005 Hong et al. .................. 349/141
2002/0105612 A1 * 8/2002 Ohta et al. ................... 349/141
2003/0043329 A1 * 3/2003 Park ............................ 349/141
2004/0174482 A1 * 9/2004 Oke et al. .................... 349/139

FOREIGN PATENT DOCUMENTS

JP 11-119237 A 4/1999
JP 2002-107744 A 4/2002
JP 2002-328816 A 11/2002

\* cited by examiner

*Primary Examiner*—Andrew Schechter
*Assistant Examiner*—W. Patty Chen
(74) *Attorney, Agent, or Firm*—Foley & Lardner LLP (57) ABSTRACT

An array substrate, a gate insulating layer, and a data line are deposited sequentially on a liquid crystal cell. At a part of this configuration, a planarizing layer covers the gate insulating layer and the data line. The planarizing layer has a groove formed right above the data line. A common electrode is formed on internal walls of the groove and on the flat surface of the planarizing layer corresponding to the shoulders of the groove. A pixel electrode is formed on the flat surface with a certain distance from the common electrode.

10 Claims, 13 Drawing Sheets

FIG.3A THE PRESENT INVENTION (DEPTH OF 2 MICROMETERS)

FIG.3B THE PRESENT INVENTION (DEPTH OF 2 MICROMETERS)

FIG.3C CONVENTIONAL EXAMPLE 1

FIG.3D CONVENTIONAL EXAMPLE 2

IN-PLANE SWITCHING LIQUID CRYSTAL DISPLAY AND LIQUID CRYSTAL DISPLAY CELL COMPRISING A GROOVE FORMED ABOVE THE DATA LINE

BACKGROUND OF THE INVENTION

1) Field of the Invention

The present invention relates to a liquid crystal display cell and a liquid crystal display that are characterized in a positional relationship between a data line and either a pixel electrode or a common electrode and in their shapes. Particularly, the present invention relates to a liquid crystal display cell and a liquid crystal display of an in-plane-switching type, respectively.

2) Description of the Related Art

A twisted nematic (hereinafter, "TN") liquid crystal display cell, which has a pixel electrode and a common electrode that are disposed so as to sandwich a liquid crystal layer, is well known, while an in-plane-switching (hereinafter, "IPS") liquid crystal display cell is proposed and is being put to practical use. The IPS liquid crystal display cell applies an electric field to a liquid crystal molecule in a direction parallel to a substrate, thereby to control the orientation of the liquid crystal molecule. Based on this mechanism, the IPS liquid crystal display cell has voltage holding characteristics and wide view field angle superior to those of the TN liquid crystal display cell that applies an electric field in a direction perpendicular to a substrate.

Figure 12A:
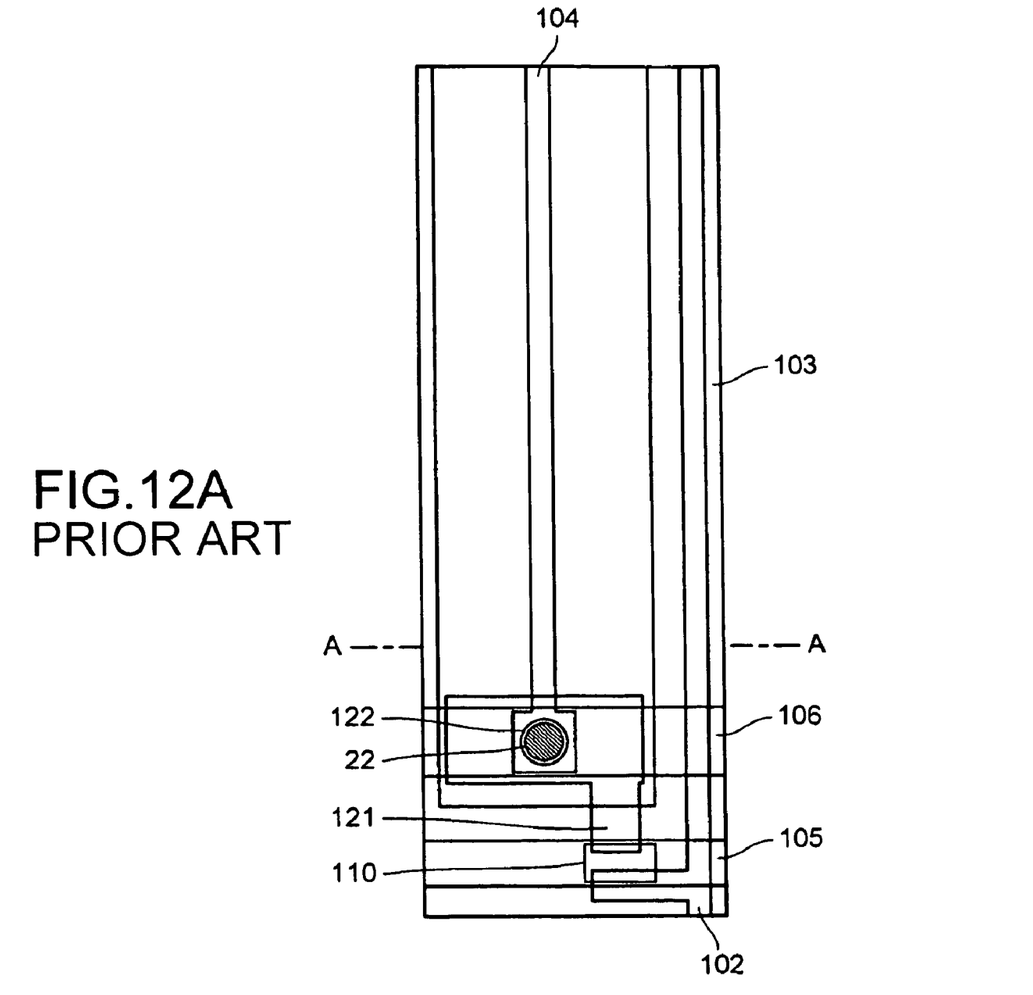
FIGS. 12A and 12B are schematic diagrams of a part of a configuration of a conventional IPS liquid crystal display cell.
Figure 12B:
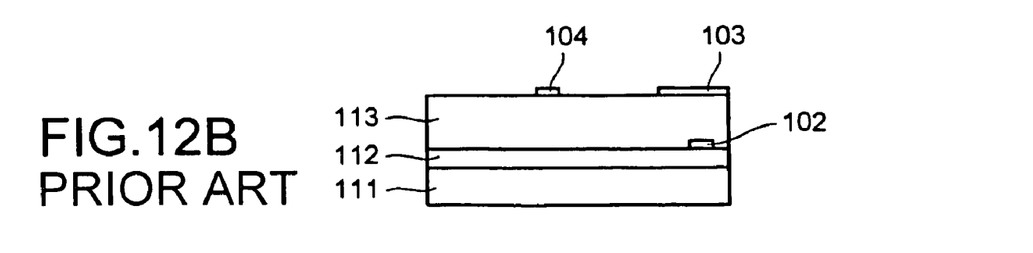

FIGS. 12A and 12B are schematic diagrams of a partial configuration of a conventional IPS liquid crystal display cell. FIG. 12A is a top plan view of this IPS liquid crystal display cell. FIG. 12B is a cross-sectional view of this configuration cut along a line A-A in FIG. 12A. According to the conventional IPS liquid crystal display cell, as illustrated in FIG. 12A, a pixel electrode 104 and a common electrode 103 extend in parallel. The 104 pixel electrode is connected to a source electrode 121 of a lower layer via a through-hole 122 formed in a planarizing layer 113. The common electrode 103 is connected to a power supply line (not illustrated). The planarizing layer 113 is formed to cover an upper surface of a gate insulating layer 112, a data line 102 formed on the gate insulating layer 112, and a channel arrangement (not illustrated) of a thin-film transistor (TFT) 110 formed on the gate insulating layer 112.

The gate insulating layer 112 is formed to cover an upper surface of an array substrate 111, and a scan line 105 formed on the array substrate 111. The scan line 105 also functions as a gate electrode of the TFT 110. The data line 102 is disposed so that a portion of the data line in its longitudinal direction is right below the common electrode 103 as illustrated in the drawings. A protrusion part of the data line 102 also functions as a drain electrode of the TFT 110. Therefore, the TFT 110 functions as a switching element that is turned ON or OFF based on a voltage of the scan line 105, that is, a scan signal. When the TFT 110 is ON, a voltage of the data line 102, that is, a pixel signal, is supplied to the pixel electrode 104 via the source electrode 121 and the through-hole 122.

In FIG. 12A, an auxiliary wire 106 is positioned on the same layer as the scan line (i.e., gate electrode) 105, and forms a capacitor with the pixel electrode 104 on the upper layer to hold the TFT 110 in the ON state. With the above arrangement, a voltage can be applied in one direction to a liquid crystal that is positioned between the common electrode 103 and the pixel electrode 104. As a result, the orientation of the liquid crystal in the in-plane direction can be achieved. For simplification, FIGS. 12A and 12B do not illustrate a cross-sectional view of the TFT 110, a liquid crystal layer positioned on the common electrode 103 and the pixel electrode 104, a color filter positioned on the liquid crystal layer, and members that are essential to construct the liquid crystal display cell on a counter substrate that fixes the color filter.

As illustrated in FIG. 12B, the common electrode 103 and the pixel electrode 104 are formed on the planarizing layer 113 with a predetermined distance. However, according to this configuration, an electric field is generated between the common electrode 103 and the data line 102 that is positioned on the layer lower. Moreover, an electric field is generated even between the common electrode 103 and the pixel electrode 104. Particularly, a disturbance of the electric field becomes remarkable in the vicinity of the pixel electrode where a potential variation occurs according to a pixel signal. As this disturbance affects the orientation of the liquid crystal, the picture quality is lowered as a result. Therefore, as illustrated in FIG. 12B, a configuration of shielding the electric field generated between the pixel electrode 104 and the data line 102 is proposed. The common electrode 103 that has a larger width than that of the data line 102 is formed right above the data line 102 (see, Japanese Patent Application Laid-open No. H11-119237).

Figure 13A:
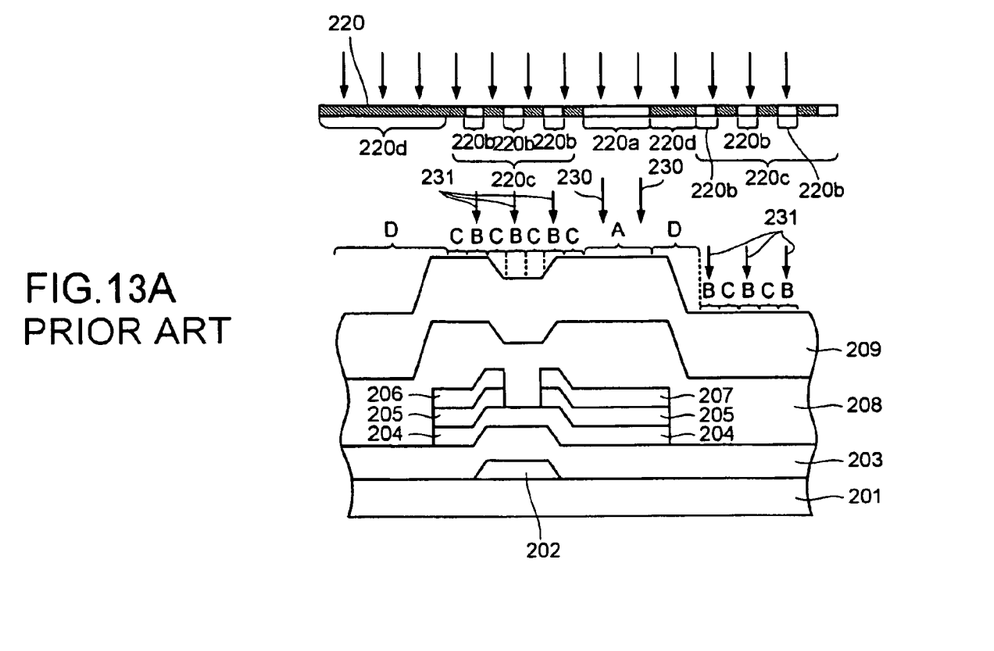
FIGS. 13A and 13B are illustrations indicating a method of forming a conventional planarizing film.
Figure 13B:
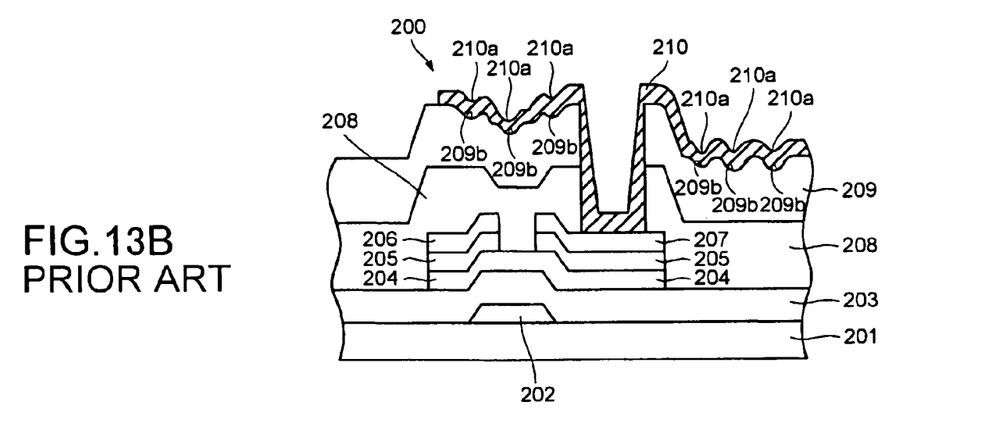

As explained above, FIGS. 12A and 12B illustrate the configurations of the liquid crystal display cells. A known method of forming the planarizing layer (see Japanese Patent Application Laid-open No. 2002-107744) as a technique relevant to the present invention will be described. In FIGS. 13A and 13B, a reference numeral 201 denotes a glass substrate, 202 denotes a gate electrode, and 203 denotes a gate insulating layer. A reference numeral 204 denotes a semiconductor layer, 205 denotes an ohmic contact layer, 206 denotes a source electrode, and 207 denotes a drain electrode. A reference numeral 208 denotes a passivation film, 209 denotes a planarizing film, 209b and 210a denote grooves, and 210 denotes a pixel electrode. A reference numeral 220 denotes a photo mask, 220a denotes an aperture, 220b denotes a slit, 220c denotes a slit section, and 220d denotes a shielding section. Reference numerals 230 and 231 denote light. FIG. 13A illustrates a state that the flat film 209 is exposed. FIG. 13B illustrates a state that the pixel electrode 210 is formed after etching the planarizing film 209.

In order to increase an irregular reflection of light by the pixel electrode 210 effective in a reflecting liquid crystal display device, this method of forming the planarizing film 209 has a main object of forming an uneven surface on the pixel electrode 210 in a simple method. For this purpose, an uneven surface needs to be formed on the planarizing film 209 that is positioned beneath the pixel electrode 210. This formation method has the following characteristics. A plurality of slits 220b each having a width of which resolution is smaller than an exposure resolution are provided on the photo mask 220 that is used in a process of exposing the planarizing film 209. By utilizing a diffraction phenomenon (i.e., interference fringe) of light due to the slit 220b, electrical energy having different sizes between the fringes is irradiated onto the surface of the planarizing film 209.

However, the conventional IPS liquid crystal display cell illustrated in FIG. 12 (hereinafter, "first conventional cell") requires the following. In order to sufficiently shield the electric field that is generated between the data line 102 and the pixel electrode 104, the amount of the electric field directed from the data line 102 toward the common electrode needs to be large. In other words, the common electrode 103 needs to have a larger width than the width of the data line 102. However, the increase in the width of the common electrode 103 causes the aperture ratio of the liquid crystal display cell to decrease.

SUMMARY OF THE INVENTION

It is an object of the present invention to at least solve the problems in the conventional technology.

A liquid crystal display cell according to one aspect of the present invention includes a substrate; an insulating layer formed on the substrate; a data line that is formed on the insulating layer and is supplied with a pixel signal; a planarizing layer that covers the data line and the insulating layer, has a groove above the data line, and has a flat surface on a shoulder of the groove; a common electrode formed on internal walls of the groove and on the flat face; a pixel electrode formed on the planarizing layer; a scan line supplied with a scan signal; a switching element that controls a voltage of the pixel electrode based on the scan signal and the pixel signal; and a liquid crystal layer disposed on the planarizing layer.

A liquid crystal display cell according to another aspect of the present invention includes a first substrate; an insulating layer formed on the first substrate; a data line that is formed on the insulating layer and is supplied with a pixel signal; a planarizing layer that covers the data line and the insulating layer, has a groove above the data line, and has a flat surface on a shoulder of the groove; a pixel electrode formed on internal walls of the groove and on the flat face; a scan line supplied with a scan signal; a switching element that controls a voltage of the pixel electrode based on the scan signal and the pixel signal; a liquid crystal layer disposed on the planarizing layer; a second substrate that is disposed so that the liquid crystal layer is disposed between the second substrate and the planarizing layer; and a common electrode formed on the second substrate.

A liquid crystal display according to another aspect of the present invention includes a liquid crystal display panel including the liquid crystal display cells that are arranged in a matrix shape; a data line driving circuit that is electrically connected to the data line to supply the pixel signal to the data line; and a scan line driving circuit that is electrically connected to the scan line to supply the scan signal to the scan line. Each of the liquid crystal display cells corresponds to the liquid crystal display cell according to the present invention.

The other objects, features and advantages of the present invention are specifically set forth in or will become apparent from the following detailed descriptions of the invention when read in conjunction with the accompanying drawings.

DETAILED DESCRIPTION

Exemplary embodiments of a liquid crystal display cell and a liquid crystal display according to the present invention will be explained below with reference to the accompanying drawings. It should be noted that these embodiments do not limit the present invention.

A liquid crystal display cell according to a first embodiment of the present invention will be explained first. According to the first embodiment, the IPS liquid crystal display cell has a groove, which is formed on a planarizing layer right above a data line, and a common electrode formed in the groove.

Figure 1:
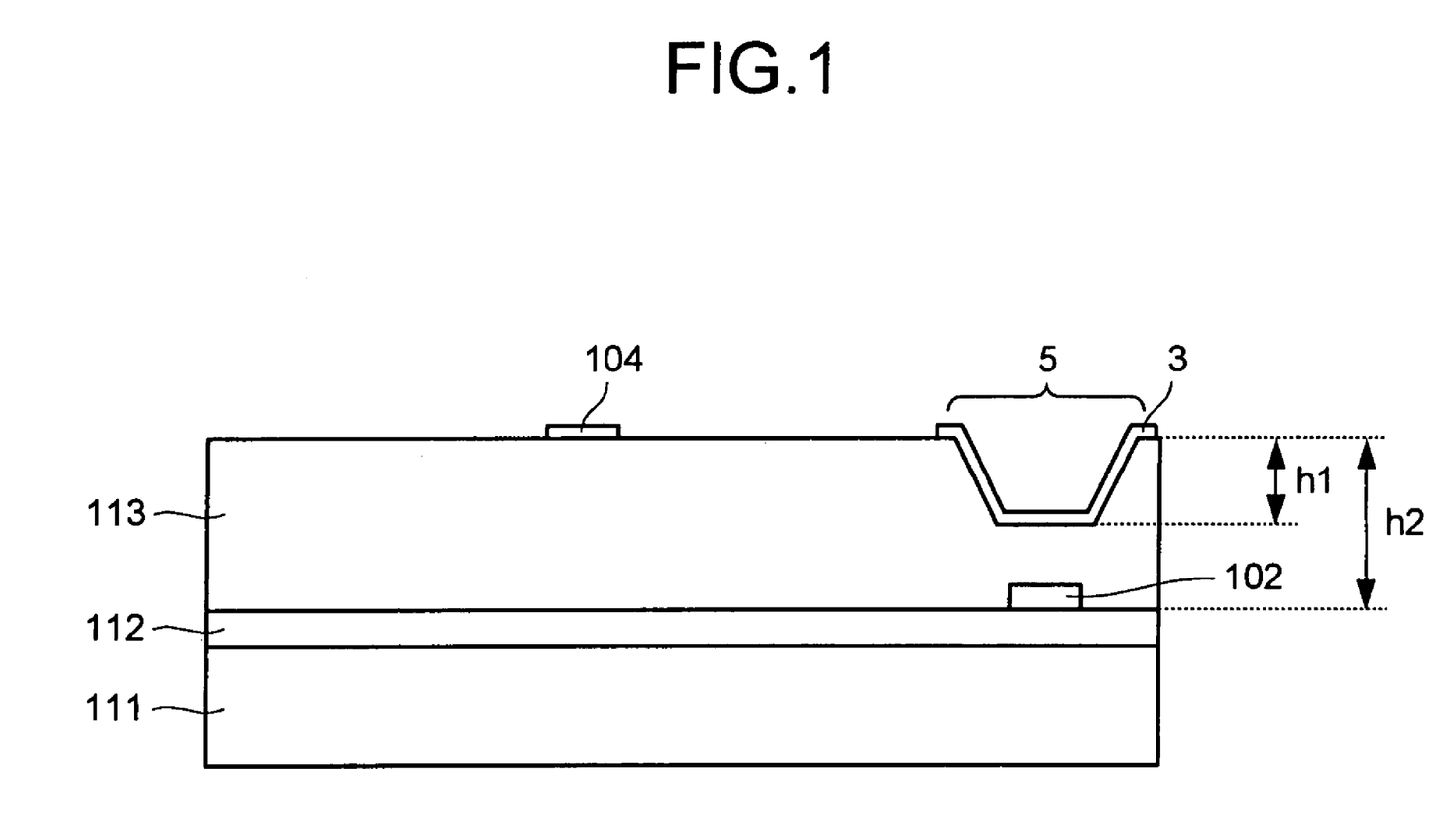
FIG. 1 is a schematic diagram of a liquid crystal display cell according to a first embodiment of the present invention.

FIG. 1 is a schematic diagram of the liquid crystal display cell according to the first embodiment. FIG. 1 is a cross-sectional view of a portion corresponding to the portion cut along the line A-A in FIG. 12A. In FIG. 1, portions common to those in FIG. 12A are designated with like reference numerals, and their explanation is omitted. As illustrated in FIG. 1, the planarizing layer 113 has a groove 5 formed right above the data line 102. A common electrode 3 is formed on internal walls (i.e., an internal surface and a bottom surface) of the groove 5, and a flat surface of the planarizing layer 113 corresponding to shoulders of the groove 5. It is preferable that a depth h1 of the groove 5 is about a half of a thickness h2 between the top (i.e., the flat surface) and the bottom of the planarizing layer 113. When the thickness h2 of the planarizing layer 113 is 4 micrometers, for example, the depth h1 of the groove 5 is preferably about 2 micrometers. When the thickness h2 of the planarizing layer 113 is larger than 4 micrometers, a parasitic capacitance between the data line 102 and the common electrode 3 becomes large, and this affects the responsiveness of an image signal transmitted to the data line 102. The width of the groove 5 is preferably equivalent to or larger than the width of the data line 102.

Figure 2A:
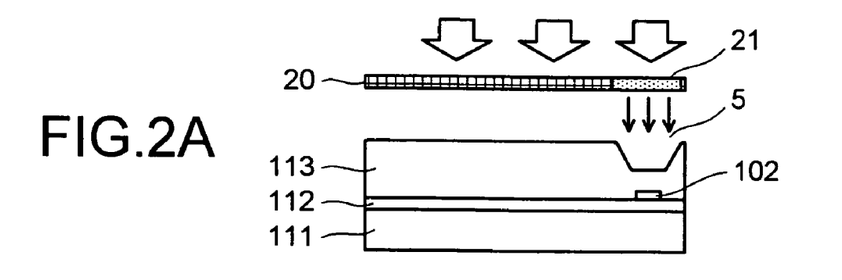
FIGS. 2A and 2B are schematic diagrams that explain about a method of forming a groove on a planarizing layer in the liquid crystal display cell according to the first embodiment.
Figure 2B:
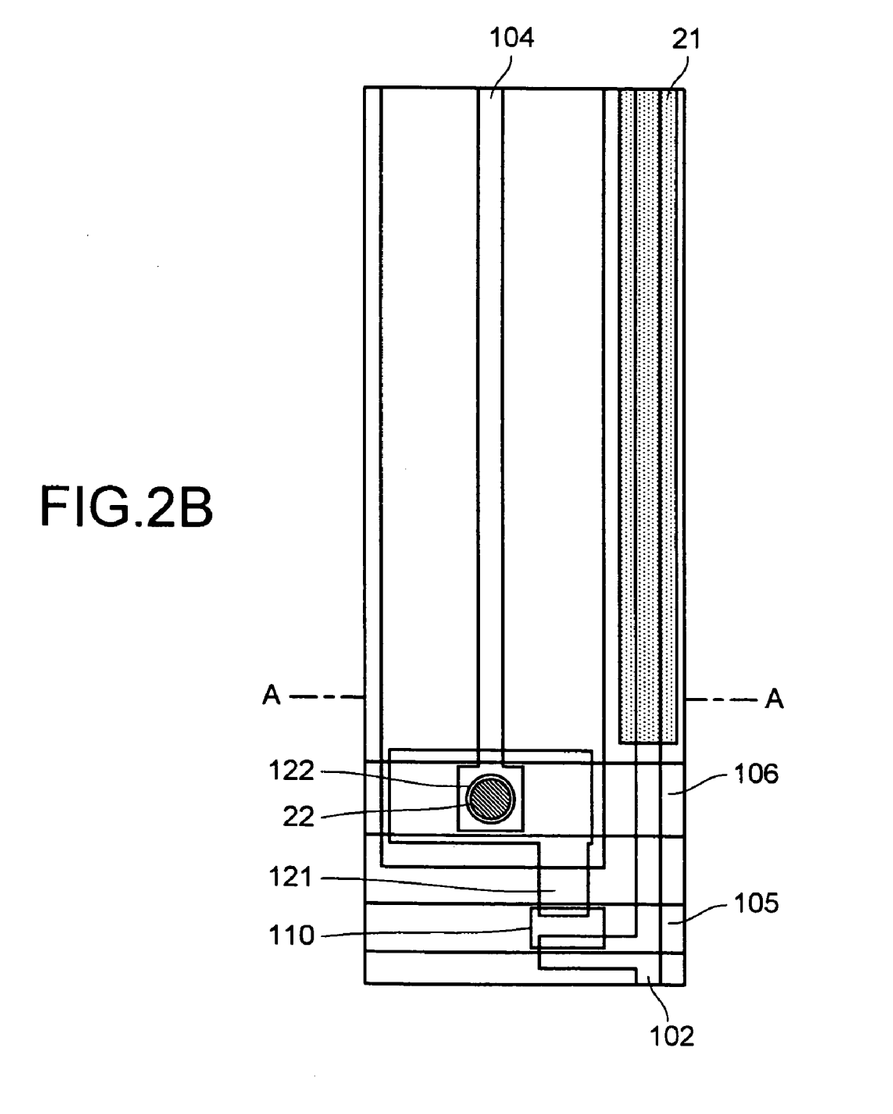

A method of forming the groove 5 will explained next. FIGS. 2A and 2B are schematic diagrams that explain about a method of forming the groove 5 on the planarizing layer 113 in the liquid crystal display cell according to the first embodiment. According to this method, a photo mask 20 in a gray tone having a light transmission factor smaller than 100% is used at a position where the groove 5 is formed, that is, at a position right above the data line 102. FIG. 2A is a cross-sectional view similar to that in FIG. 1. FIG. 2B is a top plan view of the liquid crystal display cell of which cross section cut along the line A-A corresponds to the portion illustrated in FIG. 2A. Portions common to those illustrated in FIGS. 12A and 12B are designated with like reference numerals in FIGS. 2A and 2B, and their explanation is omitted.

The planarizing layer 113 is formed with a positive type low dielectric photosensitive polymer. This polymer is coated on a channel of the TFT not illustrated and the data line 102 to cover these portions, and the polymer is cured to obtain the planarizing layer. The groove 5 is formed on the planarizing layer 113 obtained in this way. Basically, the through-hole 122 needs to be formed on the planarizing layer 113 to electrically connect between the pixel electrode 104 and the source electrode 121. Therefore, the photo mask 20 that is used to form the groove 5 includes a pattern 22 of the through-hole. The through-hole pattern 22 is an aperture that completely transmits light (ultraviolet rays). On the other hand, the portion corresponding to the groove 5 has a gray tone portion 21 that transmits only a part of irradiated light as illustrated in FIG. 2A.

The same quantity of light is irradiated onto the photo mask 20 disposed on the planarizing layer 113 during the same period. In this case, a sufficiently large quantity of light is transmitted through the through-hole pattern 22, with a result that the portion from the flat surface to the source electrode 121 of the TFT is exposed and modified. However, a small quantity of light is transmitted through the gray tone portion 21, with a result that only a portion from the flat surface to a certain depth is modified. In other words, in the development processing after the exposure, the groove 5 having the depth h1 illustrated in FIG. 1 can be obtained.

After developing the planarizing layer 113, that is, after forming the through-hole 122 and the groove 5, the process shifts to the formation of the pixel electrode 104 and the common electrode 3. The pixel electrode 104 and the common electrode 3 are formed according to a deposition using the same mask. The electrodes 104 and 3 are made of a material having conductivity and excellent light transmission characteristics, such as indium tin oxide (ITO) or indium zinc oxide (IZO). In the deposition processing of the pixel electrode 104, a conductive path is also formed to have an electrical contact with the source electrode in the lower layer via the through-hole as well as on the planarizing layer 113 as illustrated in FIG. 1.

Figure 3A:
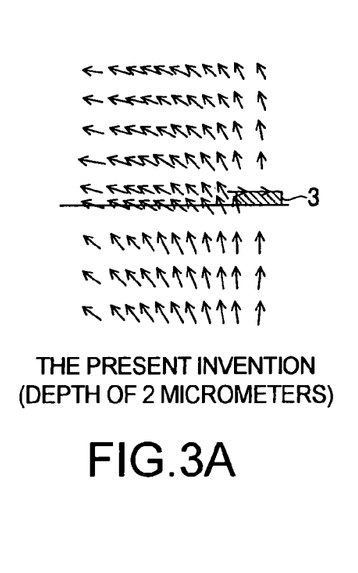
FIGS. 3A to 3D are illustrations of electric field distributions in the vicinity of a common electrode.
Figure 3B:
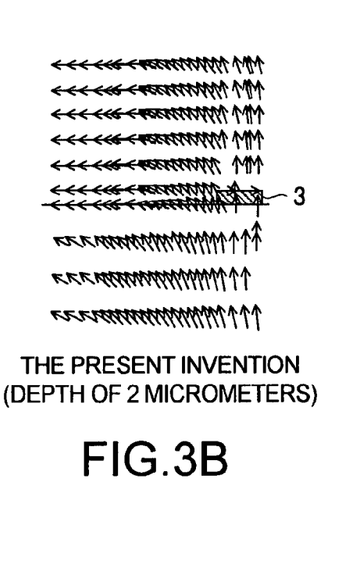
Figure 3C:
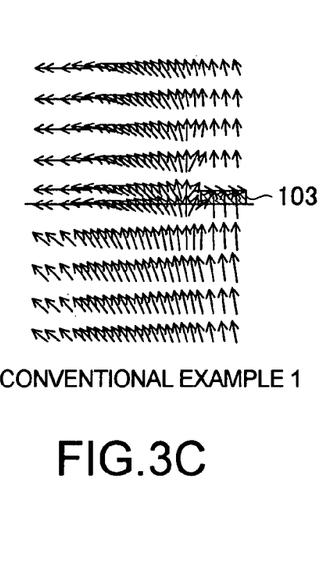
Figure 3D:
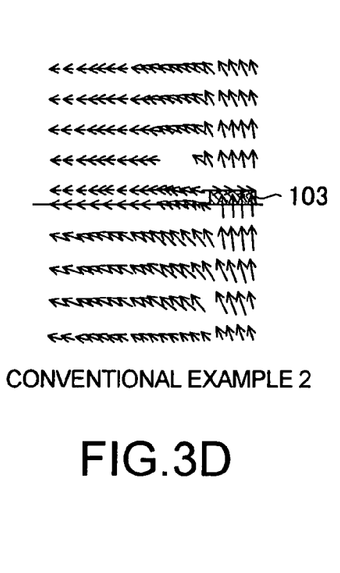

FIGS. 3A to 3D illustrate electric field distributions in the vicinity of the common electrode. FIG. 3A illustrates an electric field distribution when the depth h1 of the groove 5 is 2 micrometers in the configuration according to the present embodiment illustrated in FIG. 1. FIG. 3B illustrates an electric field distribution when the depth h1 of the groove 5 is 1 micrometer in the configuration according to the present embodiment illustrated in FIG. 1. FIG. 3C illustrates an electric field distribution in the configuration according to the first conventional cell. FIG. 3D illustrates an electric field distribution in the configuration according to the second conventional cell. As illustrated in FIG. 3C, according to the first conventional cell, a large disturbance of the electric field is observed at the edge of the common electrode 103. On the other hand, according to the second conventional cell, this disturbance is decreased. Against these conventional cells, the liquid crystal display cell according to the present embodiment has the common electrode 3 formed within the groove 5 having the depth of 2 micrometers. Therefore, substantially no disturbance of the electric field is observed. When the groove 5 has the depth of 1 micrometer, it is clear that the disturbance of the electric field can be decreased as compared with the first conventional cell illustrated in FIG. 3C.

As explained above, the IPS liquid crystal display cell according to the first embodiment has the groove formed on the planarizing layer portion right above the data line, and has the common electrode formed in the groove. Therefore, a distance between the data line 102 and the common electrode 3 becomes small, and the common electrode 3 can absorb most of the electric field generated due to the data line 102. As a result, the influence that the data line 102 gives to the pixel electrode 104 can be minimized.

A liquid crystal display cell according to a second embodiment of the present invention will be explained next. According to the second embodiment, the IPS liquid crystal display cell has two grooves formed on a planarizing layer positioned at both sides of a data line, and has a common electrode formed in each groove.

Figure 4:
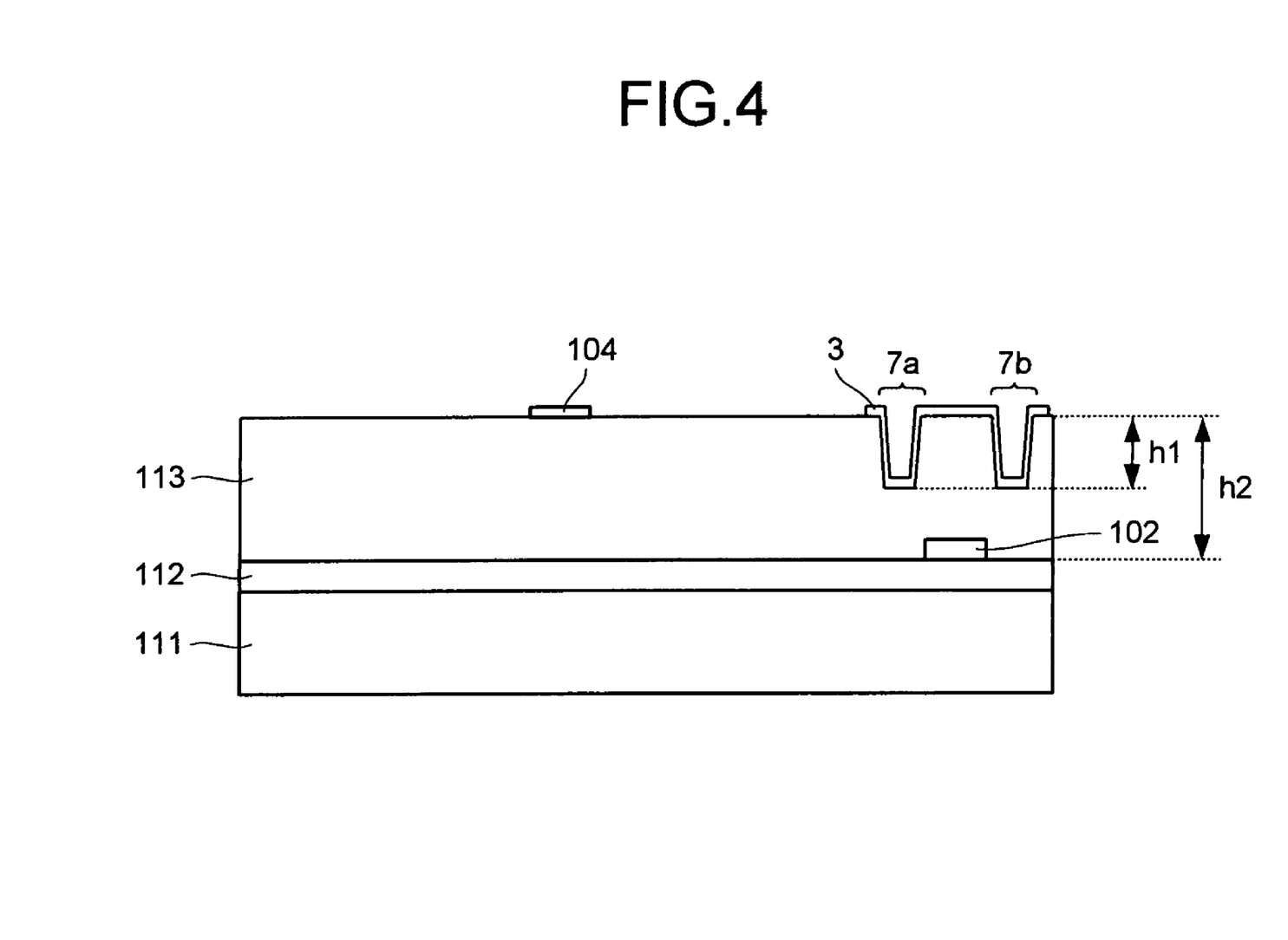
FIG. 4 is a schematic diagram of a liquid crystal display cell according to a second embodiment of the present invention.

FIG. 4 is a schematic diagram of the liquid crystal display cell according to the second embodiment. FIG. 4 is a cross-sectional view of a portion corresponding to the portion cut along the line A-A in FIG. 12A. In FIG. 4, portions common to those in FIG. 1 are designated with like reference numerals, and their explanation is omitted. As illustrated in FIG. 4, the planarizing layer 113 has grooves 7a and 7b formed at both sides of the data line 102. The common electrode 3 is formed on internal walls (i.e., internal surface and a bottom surface) of the grooves 7a and 7b, respectively, and the flat surface of the planarizing layer 113 corresponding to shoulders of the grooves 7a and 7b. It is preferable that the depth h1 of the grooves 7a and 7b is about a half of the thickness h2 of the planarizing layer 113 other than the grooves 7a and 7b, like in the groove 5 explained in the first embodiment. The widths of the grooves 7a and 7b are preferably equivalent to or larger than the width of the data line 102, respectively.

Figure 5A:
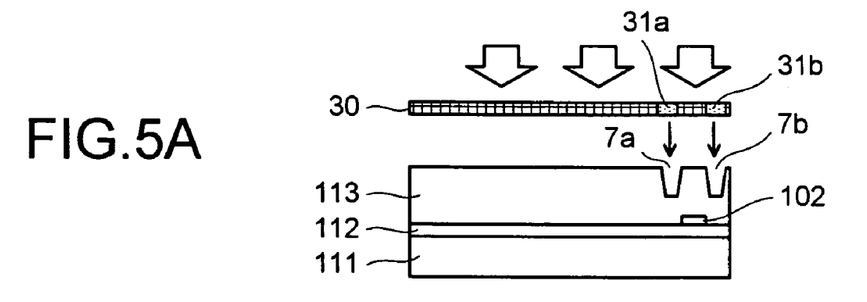
FIGS. 5A and 5B are schematic diagrams that explain about a method of forming two grooves on a planarizing layer in the liquid crystal display cell according to the second embodiment.
Figure 5B:
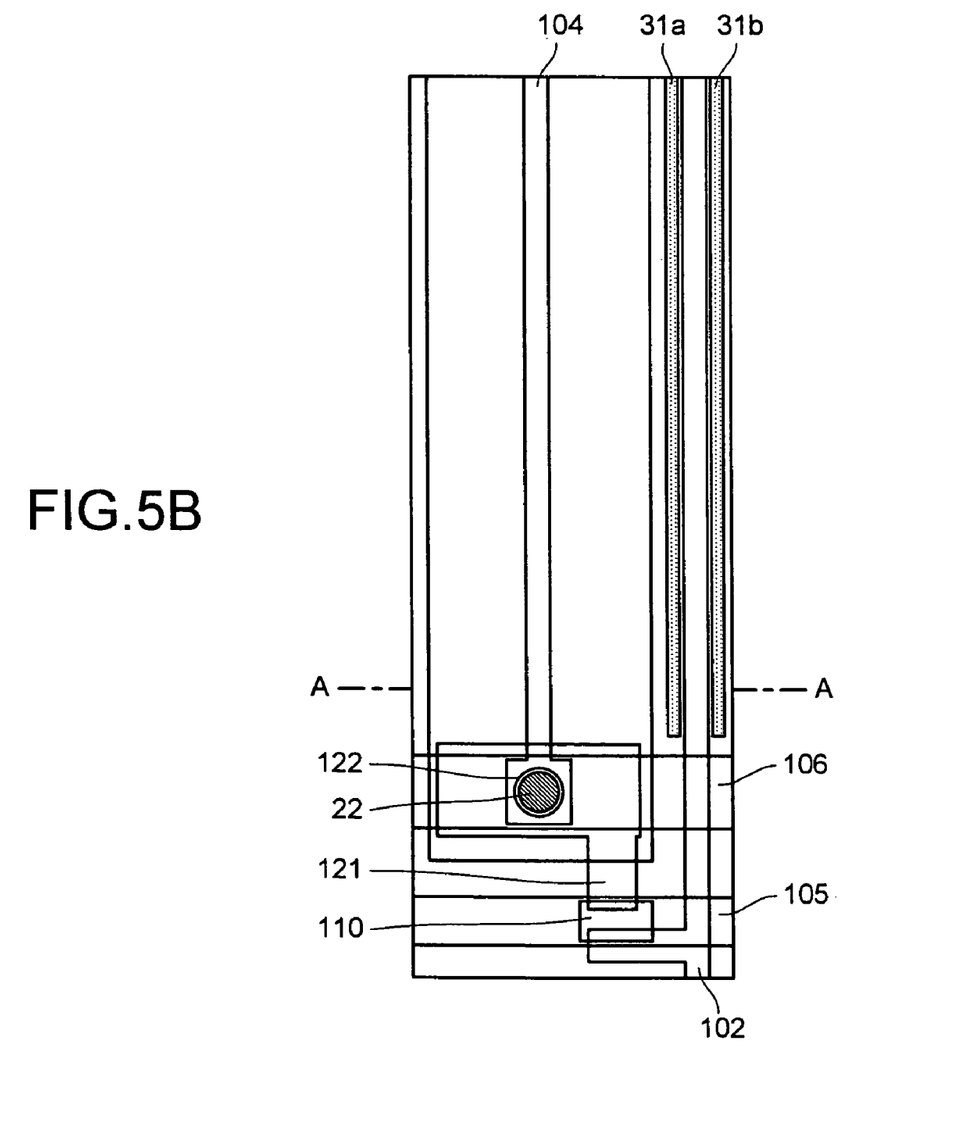

A method of forming the grooves 7a and 7b will be explained next. FIGS. 5A and 5B are schematic diagrams that explain about a method of forming the grooves 7a and 7b on the planarizing layer 113 in the liquid crystal display cell according to the second embodiment. According to this method, a photo mask 30 in a gray tone is used at positions where the grooves 7a and 7b are formed, that is, positions at both sides of the data line 102. FIG. 5A is a cross-sectional view similar to that in FIG. 4. FIG. 5B is a top plan view of the liquid crystal display cell of which cross section cut along the line A-A corresponds to the portion illustrated in FIG. 5A. Portions common to those illustrated in FIGS. 2A and 2B are designated with like reference numerals in FIGS. 5A and 5B, and their explanation is omitted. The photo mask 30 also has a pattern other than gray tones 31a and 31b, that is, the through-hole pattern 22, like the photo mask 20 explained in the first embodiment.

The same quantity of light is irradiated onto the photo mask 30 disposed on the planarizing layer 113 during the same period. In this case, a sufficiently large quantity of light is transmitted through the through-hole pattern 22, with a result that the portion from the flat surface to the source electrode 121 of the TFT is exposed and modified. However, a small quantity of light is transmitted through the gray tones 31a and 31b, with a result that only a portion from the flat surface to a certain depth is modified. In other words, in the development processing after the exposure, the grooves 7a and 7b having the depth h1 respectively illustrated in FIG. 4 can be obtained.

After developing the planarizing layer 113, that is, after forming the through-hole 122 and the grooves 7a and 7b, the process shifts to the formation of the pixel electrode 104 and the common electrode 3, in a similar manner to that explained in the first embodiment.

As explained above, the IPS liquid crystal display cell according to the second embodiment has the grooves formed on the planarizing layer portion at both sides of the data line, and has the common electrode formed within each groove. Therefore, effects similar to those obtained in the first embodiment can be obtained. Further, in the liquid crystal display cell according to the second embodiment, the common electrode 103 right above the data line 102 is positioned on the flat surface of the planarizing layer 113, with a sufficient distance. Therefore, the parasitic capacitance between the data line 102 and the common electrode 103 can be minimized. As a result, a more stable liquid crystal can be achieved.

A liquid crystal display cell according to a third embodiment of the present invention will be explained next. In the third embodiment, another example of a method of forming the groove on the planarizing layer 113 illustrated in the first and the second embodiments will be explained. A configuration obtained is similar to that illustrated in FIG. 1 or FIG. 4. In the first and the second embodiments, in forming the groove on the planarizing layer 113, the photo mask in the gray tone is used at the position corresponding to the groove. In the third embodiment, a photo mask having a slit of a width of which resolution is smaller than the exposure resolution (or a width smaller than a diffraction limit) is used at this position.

Figure 6A:
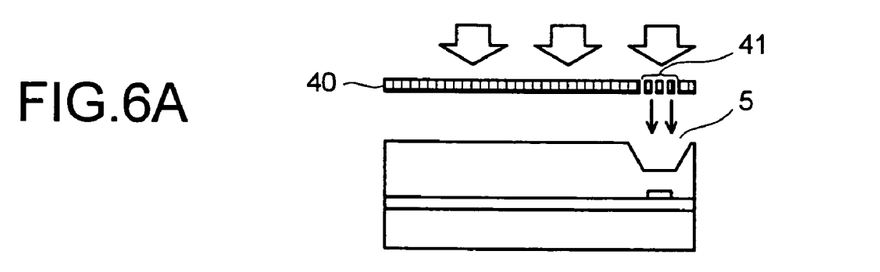
FIGS. 6A and 6B are schematic diagrams that explain about a method of forming a groove right above a data line in a third embodiment.
Figure 6B:
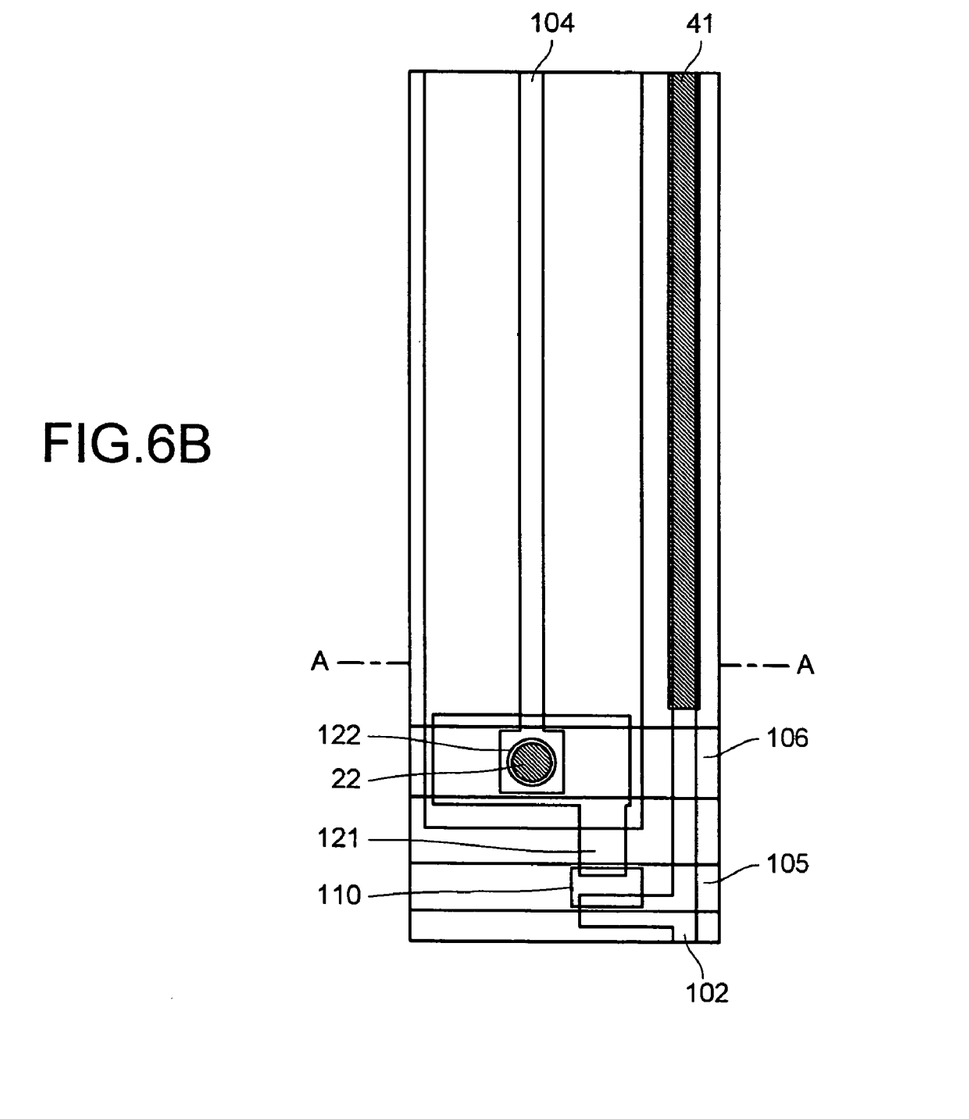

FIGS. 6A and 6B are schematic diagrams that explain about a method of forming a groove right above the data line in the third embodiment. FIG. 6A is a cross-sectional view similar to that illustrated in FIG. 1. FIG. 6B is a top plan view of a portion corresponding to the portion cut along the line A-A in FIG. 6A. In FIGS. 6A and 6B, portions common to those in FIGS. 2A and 2B are designated with like reference numerals, and their explanation is omitted. In FIGS. 6A and 6B, a photo mask 40 has a slit portion 41 at a position where the groove 5 is formed, that is, at a position right above the data line 102. Particularly, this slit portion 41 has a plurality of slits that extend in a longitudinal direction, each slit having a width of which resolution is smaller than the exposure resolution. The photo mask 40 also has a pattern other than the pattern of the slit portion 41, that is, the through-hole pattern 22, like the photo mask 20 explained in the first embodiment.

The same quantity of light is irradiated onto the photo mask 40 disposed on the planarizing layer 113 during the same period. A sufficiently large quantity of light is transmitted through the through-hole pattern 22, with a result that the portion from the flat surface to the source electrode 121 of the TFT is exposed and modified. However, in the slit portion 41, an incident ray spreads due to the diffraction. The light density becomes small, with a result that only a portion from the flat surface to a certain depth of the planarizing layer 113 is modified. In other words, in the development processing after the exposure, the groove 5 having the depth h1 illustrated in FIG. 1 can be obtained.

After developing the planarizing layer 113, that is, after forming the through-hole 122 and the groove 5, the process shifts to the formation of the pixel electrode 104 and the common electrode 3 as explained in the first embodiment.

Figure 7A:
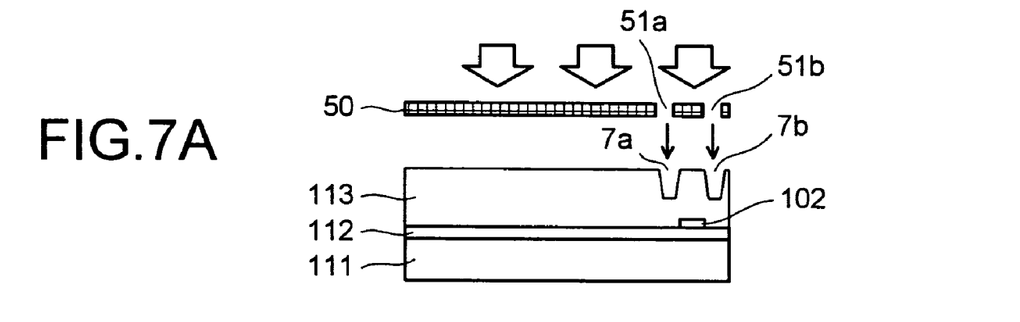
FIGS. 7A and 7B are schematic diagrams that explain about a method of forming two grooves on both sides of a data line in the third embodiment.
Figure 7B:
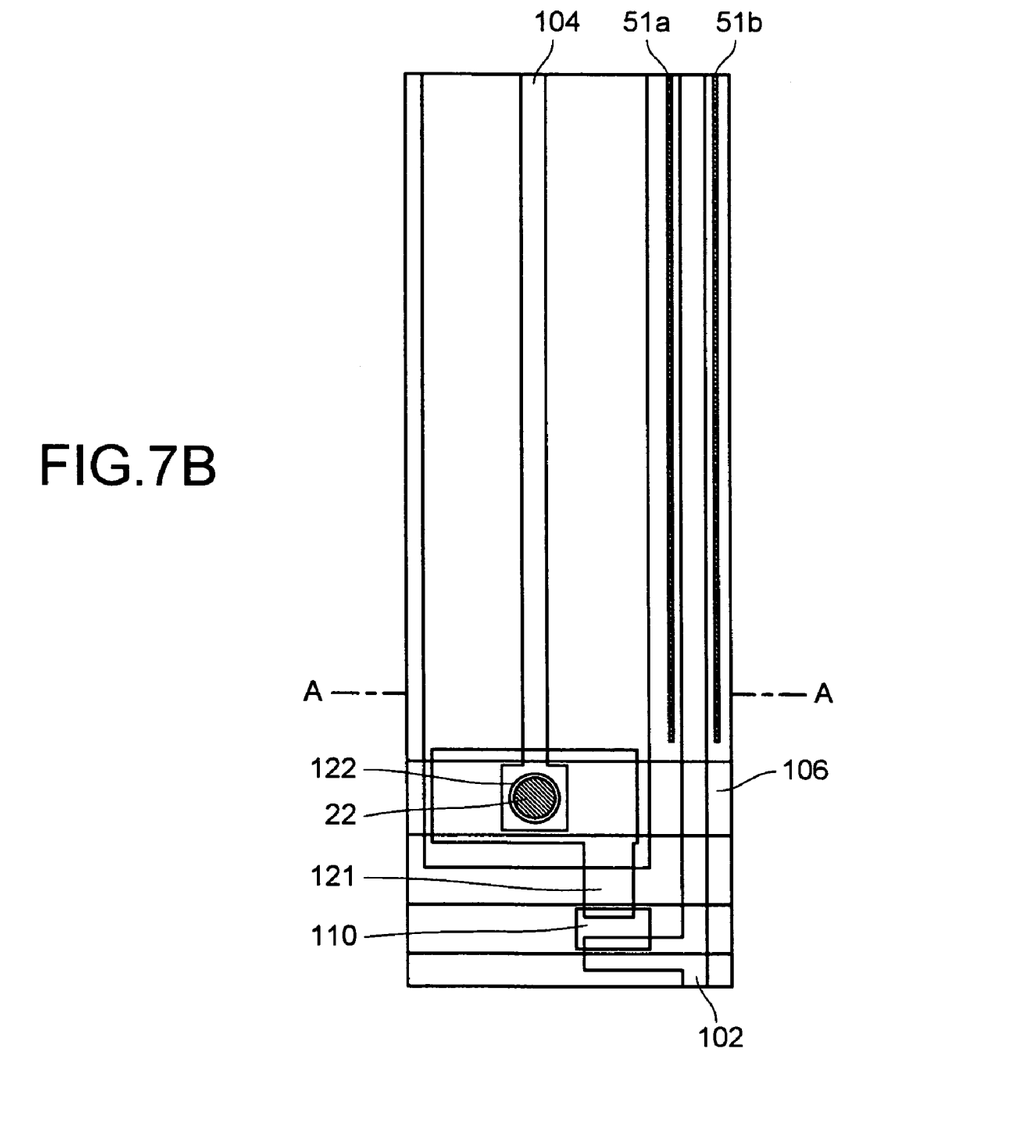

FIGS. 7A and 7B are schematic diagrams that explain about a method of forming grooves at both sides of the data line. FIG. 7A is a cross-sectional view similar to that illustrated in FIG. 4. FIG. 7B is a top plan view of a portion corresponding to the portion cut along the line A-A in FIG. 7A. In FIGS. 7A and 7B, portions common to those in FIGS. 2A and 2B are designated with like reference numerals, and their explanation is omitted. In FIGS. 7A and 7B, a photo mask 50 has slit portions 51a and 51b at positions where the grooves 7a and 7b are formed, that is, at both sides of the data line 102. Particularly, the slit portions 51a and 51b have at least one slit that extends in a longitudinal direction, each slit having a width of which resolution is smaller than the exposure resolution. The photo mask 50 also has a pattern other than the pattern of the slit portions 51a and 51b, that is, the through-hole pattern 22, like the photo mask 20 explained in the first embodiment.

The same quantity of light is irradiated onto the photo mask 50 disposed on the planarizing layer 113 during the same period. A sufficiently large quantity of light is transmitted through the through-hole pattern 22, with a result that the portion from the flat surface to the source electrode 121 of the TFT is exposed and modified, like the photo mask 40 illustrated in FIG. 6A and FIG. 6B. However, in the slit portions 51a and 51b, only a portion from the flat surface to a certain depth of the planarizing layer 113 is modified. In other words, in the development processing after the exposure, the grooves 7a and 7b having the depth h1 illustrated in FIG. 4 can be obtained.

Figure 8A:
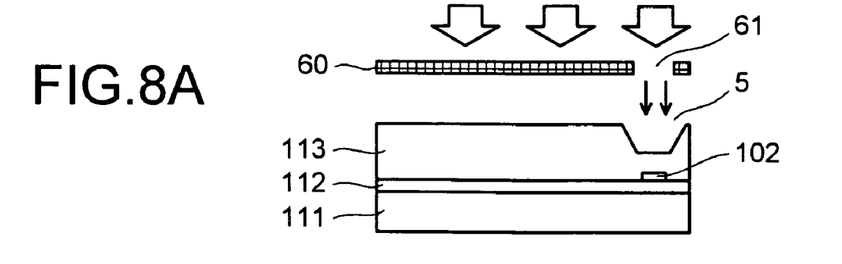
FIGS. 8A and 8B are schematic diagrams that explain about another method of forming a groove right above a data line in the third embodiment.
Figure 8B:
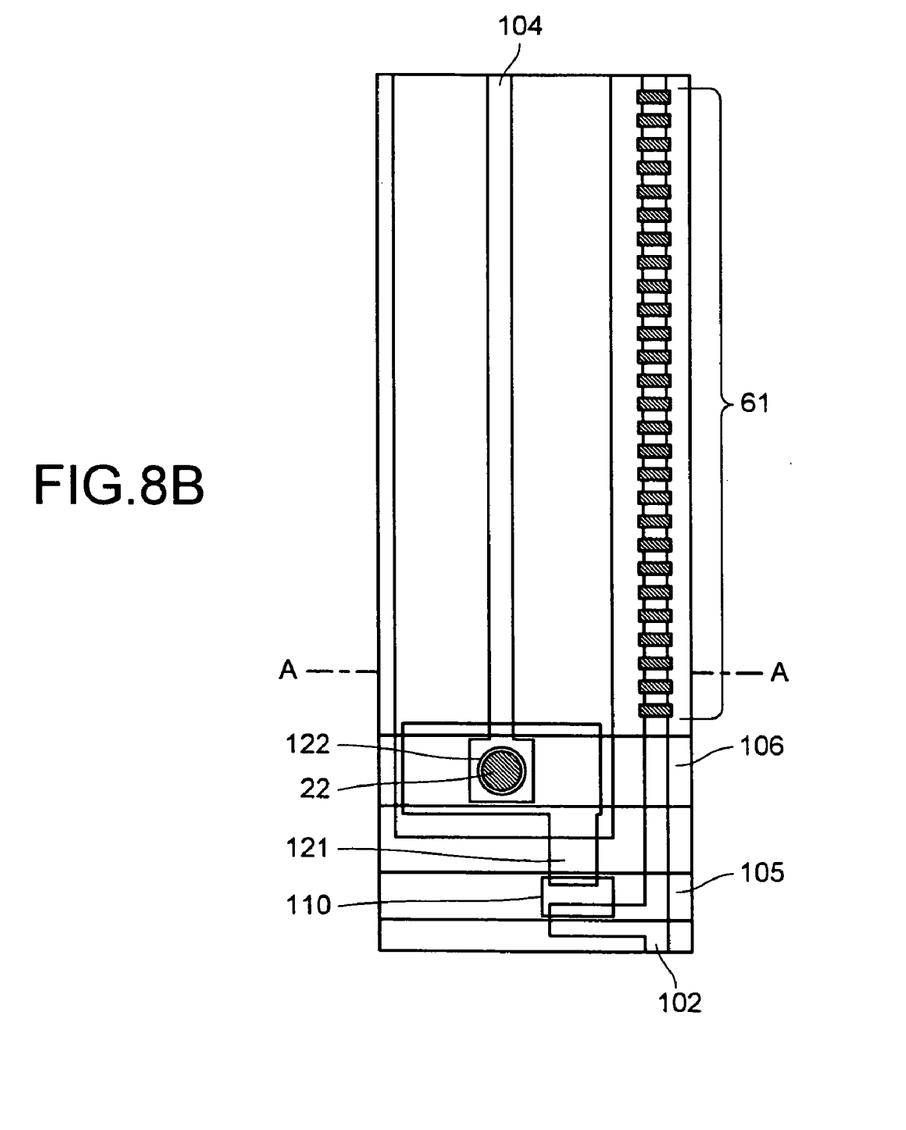

Each slit that constitutes the slit portion does not need to extend in the longitudinal direction of the data line 102 as illustrated in FIG. 6 and FIG. 7, and the slits can be laid out in parallel. FIGS. 8A and 8B are schematic diagrams that explain about this example. FIG. 8A is a cross-sectional view similar to that illustrated in FIG. 4. FIG. 8B is a top plan view of a portion corresponding to the portion cut along the line A-A in FIG. 8A. In FIGS. 8A and 8B, a slit portion 61 of a photo mask 60 has a width of which resolution is smaller than the exposure resolution. The slit portion 61 has a plurality of slits formed with a certain interval between them in a direction perpendicular to the longitudinal direction of the data line 102. In FIGS. 8A and 8B, portions common to those in FIGS. 2A and 2B are designated with like reference numerals, and their explanation is omitted. While FIGS. 8A and 8B illustrate the groove 5 formed right above the data line 102, a photo mask having a slit similar to the slit portion 61 can also be used when the grooves 7a and 7b are formed at both side of the data line 102 as illustrated in FIGS. 7A and 7B.

As explained above, the IPS liquid crystal display cell according to the third embodiment can use the photo mask having the slit of a width of which resolution is smaller than the exposure resolution. With this arrangement, a groove is formed on the planarizing layer as explained in the first and the second embodiments.

A liquid crystal display cell according to a fourth embodiment of the present invention will be explained next. In the fourth embodiment, another example of forming a groove on the planarizing layer 113 illustrated in the first and the second embodiments will be explained, like in the third embodiment. A configuration obtained is similar to that illustrated in FIG. 1 or FIG. 4. In the first and the second embodiments, in forming the groove on the planarizing layer 113, the photo mask in the gray tone is used at the position corresponding to the groove. In the fourth embodiment, the gray tone portion is an aperture that entirely transmits light. The photo mask having this aperture is shifted to a position of forming a separate groove in the middle of the exposure.

Figure 9A:
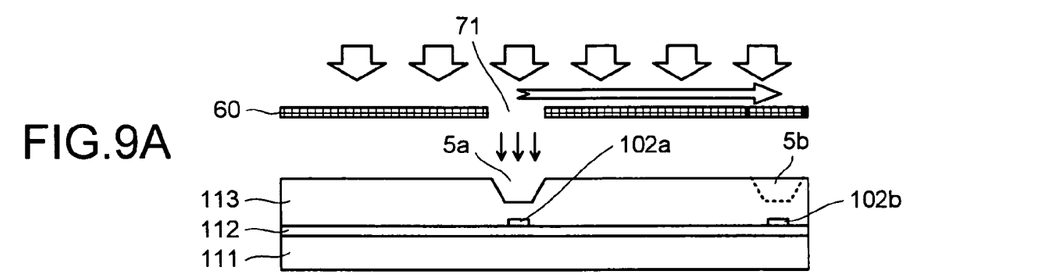
FIGS. 9A and 9B are schematic diagrams that explain about a method of forming a groove right above a data line in a fourth embodiment.
Figure 9B:
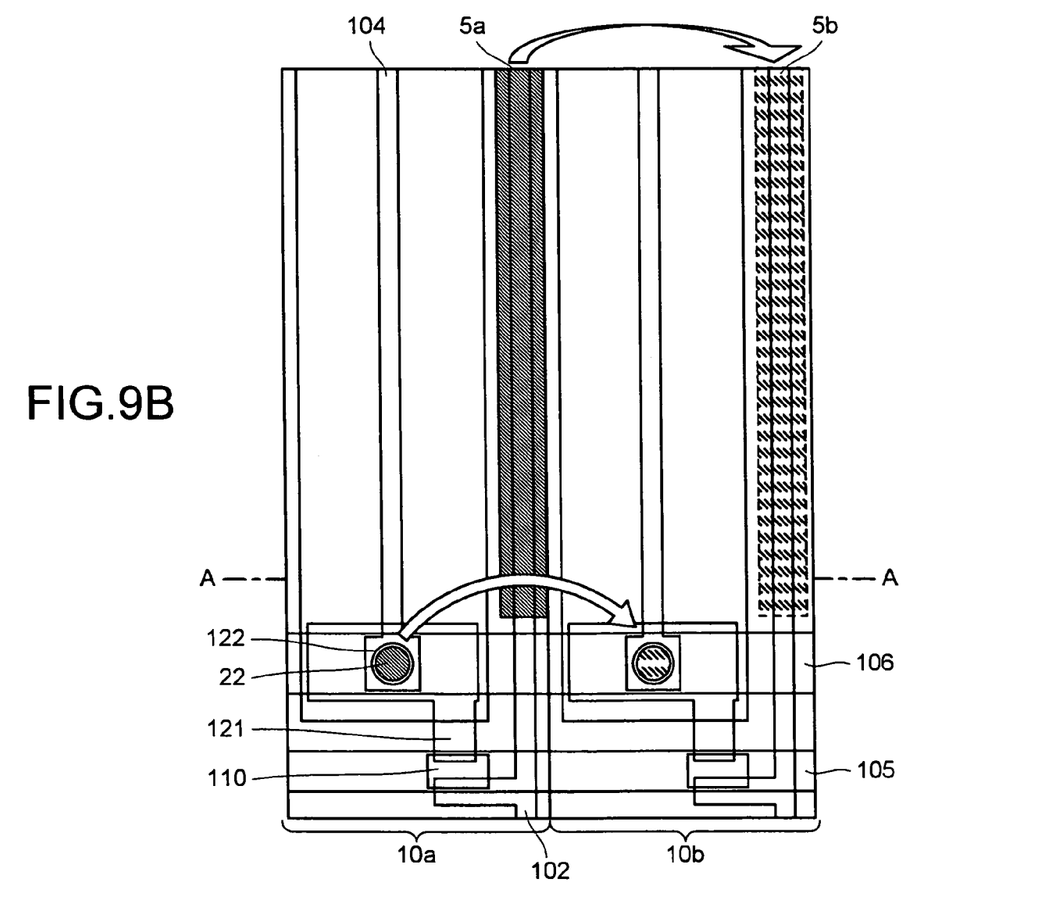

FIGS. 9A and 9B are schematic diagrams that explain about a method of forming a groove right above the data line in the fourth embodiment. FIG. 9A is a cross-sectional view similar to that illustrated in FIG. 1. FIG. 9B is a top plan view of a portion corresponding to the portion cut along the line A-A in FIG. 9A. In FIGS. 9A and 9B, portions common to those in FIGS. 2A and 2B are designated with like reference numerals, and their explanation is omitted. In FIGS. 9A and 9B, a photo mask 70 has an aperture 71 at a position where the groove 5 is formed, that is, at a position right above the data line 102. The width of the aperture 71 does not need to have a resolution smaller than the exposure resolution. The photo mask 70 also has a pattern other than the pattern of the slit portion 41, that is, the through-hole pattern 22, like the photo mask 20 explained in the first embodiment.

The photo mask 70 is used at the time of forming a plurality of liquid crystal display cells in a matrix at one time. According to the photo mask explained in the first to the third embodiments, the through-hole pattern and the groove formation pattern are formed individually in all the liquid crystal display cells. However, according to the photo mask 70 used in the fourth embodiment, the through-holes are formed corresponding to all the liquid crystal display cells. On the other hand, the groove formation pattern is formed at every other scan line 105 or at every other data line 102. In other words, in the state that the photo mask is first fixed in the exposure process, the groove formation pattern is positioned in only liquid crystal display cells in odd columns or in only liquid crystal display cells in odd rows that constitute the matrix.

According to the exposure process explained so far, the photo mask does not need to be moved during the exposure. However, in the present embodiment, the photo mask 70 is moved at timing and in a distance explained below during the exposure. When the time necessary to form a through-hole is t, this photo mask 70 is moved momentarily by one liquid crystal display cell at time t/2 since the start of the exposure. After t/2 since this move, the exposure ends. This will be explained with reference to FIGS. 9A and 9B. The exposure is started in the state that a through-hole and a groove formation pattern are disposed on a liquid crystal display cell 10a. At time t/2, the aperture 71 of the photo mask 70 is moved to an adjacent liquid crystal display cell 10b as shown by an arrow mark. Then, the exposure is carried out during the time t/2.

With the above arrangement, exposure is carried out for the time t at a position where the through-hole of each liquid crystal display cell is formed. On the other hand, exposure is carried out for only the time t/2 at a position where the groove 5 is formed. This means that at the position where the groove 5 is formed, modification from the surface of the planarizing layer 113 to the channel of the TFT not illustrated cannot be given to the planarizing layer 113. In the development processing after the exposure, the groove 5 having the height h1 illustrated in FIG. 1 can be obtained.

The groove formation pattern may be formed at every two cells in stead of at every other cell. The formation position can be suitably designed according to the height h1 of the groove 5. In this case, the time interval of moving the photo mask 70 also needs to be adjusted.

Figure 10A:
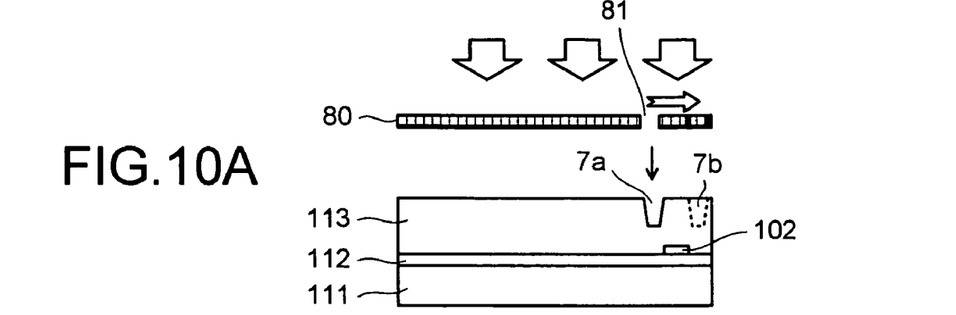
FIGS. 10A and 10B are schematic diagrams that explain about a method of forming two grooves on both sides of a data line in the third embodiment.
Figure 10B:
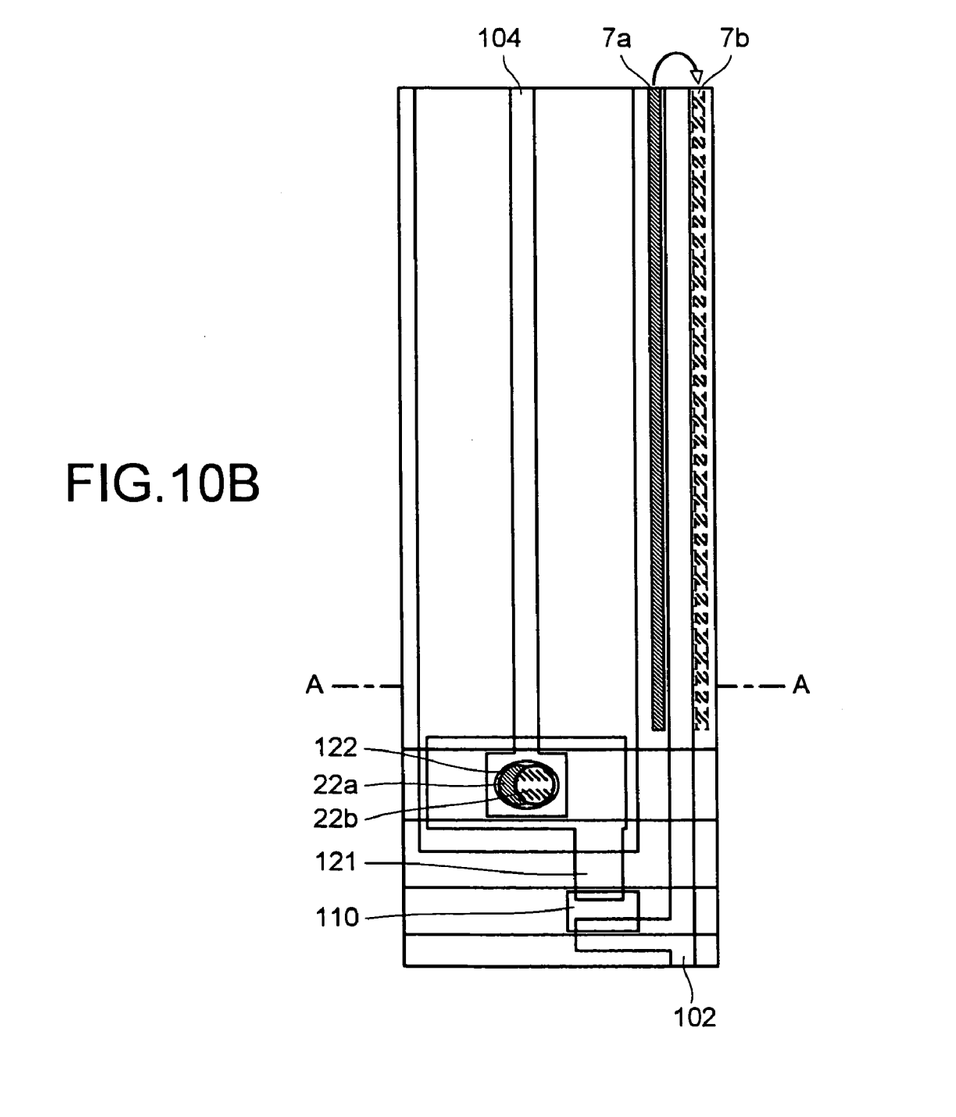

FIGS. 10A and 10B are schematic diagrams that explain about a method of forming grooves at both sides of the data line according to the fourth embodiment. FIG. 10A is a cross-sectional view similar to that illustrated in FIG. 4. FIG. 10B is a top plan view of a portion corresponding to the portion cut along the line A-A in FIG. 10A. In FIGS. 10A and 10B, portions common to those in FIGS. 2A and 2B are designated with like reference numerals, and their explanation is omitted. In the above formation method explained with reference to FIGS. 9A and 9F, the distance of moving the photo mask 70 and the groove pattern formation position change based on the size of the liquid crystal display cell. According the formation method explained with reference to FIGS. 10A and 10B, the above moving distance and position change based on a distance between the groove formation positions sandwiching the same data line 102.

As illustrated in FIGS. 10A and 10B, when an aperture 81 moves during the exposure, areas 22a and 22b are partially exposed in superimposition during the move in the region where the through-hole 122 is formed. The through-hole is formed from the surface of the planarizing layer 113 to the channel of the TFT not illustrated, at only the superimposed portion.

As explained above, the IPS liquid crystal display cell according to the fourth embodiment uses the photo mask having the groove formation pattern at only a part of a plurality of groove formation positions. During the exposure, the photo mask is moved at a predetermined timing and in a predetermined distance. With this arrangement, the groove explained in the first and the second embodiments can be formed on the planarizing layer.

A liquid crystal display cell according to a fifth embodiment of the present invention will be explained next. In the fifth embodiment, the groove formation explained in the first embodiment is applied to the TN type liquid crystal display cell.

Figure 11A:
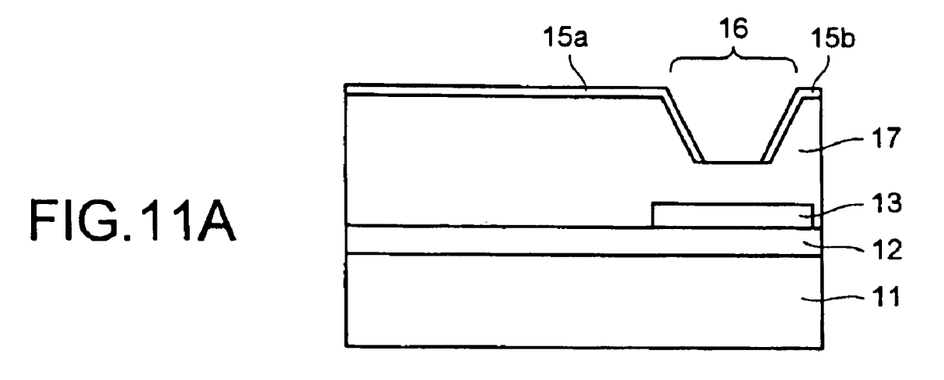
FIG. 11A is a cross-sectional view of a part of a TN liquid crystal display cell to which the present invention is applied.
Figure 11B:
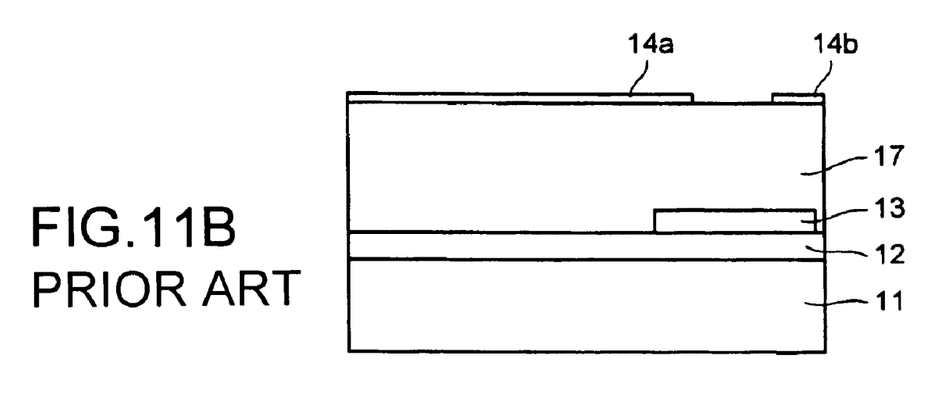
FIG. 11B is a cross-sectional view of the corresponding part of the conventional TN liquid crystal display cell.

FIG. 11A is a cross-sectional view of a part of a TN type liquid crystal display cell to which the present invention is applied, and FIG. 11B is a cross-sectional view of the corresponding part of the conventional TN liquid crystal display cell. As illustrated in FIG. 11B, according to the conventional TN liquid crystal display cell, a data line 13 is formed on a gate insulating layer 12 that is formed on an array substrate 11. A planarizing layer 17 is formed to cover the data line 13 and the gate insulating layer 12. Pixel electrodes 14a and 14b of adjacent liquid crystal display cells are formed on the surface of the planarizing layer 17, with the data line 13 as a center.

In contrast to this conventional configuration, a groove 16 is formed on the planarizing layer 17 according to the method explained in the first, third, or fourth embodiment. Pixel electrodes 15a and 15b are formed on internal walls of the groove 16 and the surface of the planarizing layer 17, respectively. In order to avoid both pixel electrodes from being brought into contact with each other, the following arrangement is necessary. A front end of the pixel electrode 15a is formed at the left side of the groove 16, and a front end of the pixel electrode 15b is formed at the right side of the groove 16.

As explained above, according to the fifth embodiment, the configuration explained in the first embodiment can also be employed in the TN liquid crystal display cell. Effects similar to those in the first embodiment can also be obtained.

In the first to the fifth embodiments, a protection film may be present between the data line and planarizing layer.

It is needless to mention that a liquid crystal display that obtains the effects of the present invention can be provided based on a combination of a liquid crystal display panel, a scan line driving circuit, and a data line driving circuit. The liquid crystal display panel has the liquid crystal display cells explained in any one of the first to the fifth embodiments laid out in a matrix shape.

As explained above, according to the liquid crystal display cell and the liquid crystal display of the present invention, a pixel electrode or a common electrode is formed right above or at both sides of a data line that constitutes the liquid crystal display cell and within a groove of a planarizing layer. Therefore, there is an effect that the electrode formed within the groove achieves an effective shielding of the electric field of the data line. A high-definition image display can be achieved without decreasing the aperture ratio.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A liquid crystal display cell comprising:
   a substrate;
   an insulating layer formed on the substrate;
   a data line that is formed on the insulating layer and is supplied with a pixel signal;
   a planarizing layer that covers the data line and the insulating layer and has a groove formed above the data line, the groove having two shoulders, the planarizing layer having a flat surface on at least one of the shoulders of the groove;
   a common electrode formed on internal walls of the groove and on the flat surface, wherein a portion of the common electrode is located above the data line;
   a pixel electrode formed on the planarizing layer;
   a scan line supplied with a scan signal;
   a switching element that controls a voltage of the pixel electrode based on the scan signal and the pixel signal; and
   a liquid crystal layer disposed on the planarizing layer.

2. The liquid crystal display cell according to claim 1, wherein the planarizing layer has the groove right above the data line.

3. The liquid crystal display cell according to claim 1, wherein the groove has a width that is equal to or larger than a width of the data line.

4. The liquid crystal display cell according to claim 1, wherein the planarizing layer further comprises a second groove that is disposed so as to sandwich a part of the planarizing layer with the groove, and the part of the planarizing layer is right above the data line.

5. The liquid crystal display cell according to claim 4, wherein each of the groove and the second groove has a width that is smaller than a width of the data line.

6. The liquid crystal display cell according to claim 1, wherein
   the planarizing layer has flat surfaces on both of the shoulders of the groove, and
   the common electrode is formed on the internal walls of the groove and on the flat surfaces.

7. The liquid crystal display cell according to claim 1, wherein the planarizing layer has a through-hole that electrically connects between the switching element and the pixel electrode.

8. The liquid crystal display cell according to claim 1, further comprising a protection film disposed between the planarizing layer and the data line.

9. A liquid crystal display cell comprising:
   a substrate;
   an insulating layer formed on the substrate;
   a data line that is formed on the insulating layer and is supplied with a pixel signal;
   a planarizing layer that covers the data line and the insulating layer and has a groove, the groove having two shoulders, the planarizing layer having a flat surface on at least one of the shoulders of the groove;
   a common electrode formed on internal walls of the groove and on the flat surface, wherein a portion of the common electrode is located above the data line;
   a pixel electrode formed on the planarizing layer;
   a scan line supplied with a scan signal;
   a switching element that controls a voltage of the pixel electrode based on the scan signal and the pixel signal; and
   a liquid crystal layer disposed on the planarizing layer,
   wherein the groove has a depth that is equal to or smaller than a half of a thickness between the flat surface and a bottom of the planarizing layer.

10. A liquid crystal display comprising:
    a liquid crystal display panel including liquid crystal display cells that are arranged in a matrix shape, each of the liquid crystal display cells including
    a substrate;
    an insulating layer formed on the substrate;
    a data line that is formed on the insulating layer and is supplied with a pixel signal;
    a planarizing layer that covers the data line and the insulating layer and has a groove formed above the data line, the groove having two shoulders, the planarizing layer having a flat surface on at least one of the shoulders of the groove;
    a common electrode formed on internal walls of the groove and on the flat surface;
    a pixel electrode formed on the planarizing layer;
    a scan line supplied with a scan signal;
    a switching element that controls a voltage of the pixel electrode based on the scan signal and the pixel signal; and
    a liquid crystal layer disposed on the planarizing layer;
    a data line driving circuit that is electrically connected to the data line to supply the pixel signal to the data line; and
    a scan line driving circuit that is electrically connected to the scan line to supply the scan signal to the scan line.

* * * * *